United States Patent
Cho (10) Patent No.: US 7,180,671 B2
(45) Date of Patent: Feb. 20, 2007

(54) LASER OPTICAL SYSTEM FOR LIQUID CRYSTAL DISPLAY DEVICE

(75) Inventor: Deog-Yong Cho, Gyungsangnam-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/876,684

(22) Filed: Jun. 28, 2004

(65) Prior Publication Data

US 2005/0134964 A1    Jun. 23, 2005

(30) Foreign Application Priority Data

Dec. 23, 2003    (KR)    .................... 10-2003-0095741

(51) Int. Cl.
*G02B 27/10* (2006.01)
(52) U.S. Cl. ........................................ 359/621
(58) Field of Classification Search ........ 359/618–622, 359/641, 722, 723, 738; 353/102, 122; 348/761, 348/790; 349/61, 62, 95; 362/259, 268; 345/690, 697

See application file for complete search history.

(56) References Cited

U.S. PATENT DOCUMENTS

| 6,341,042 | B1* | 1/2002 | Matsunaka et al. | ......... 359/618 |
| 6,870,126 | B2* | 3/2005 | Jyumonji et al. | ...... 219/121.65 |
| 2001/0043399 | A1* | 11/2001 | Murra et al. | ................ 359/622 |
| 2005/0059223 | A1* | 3/2005 | Im | .............................. 438/487 |

* cited by examiner

*Primary Examiner*—Alicia M Harrington
(74) *Attorney, Agent, or Firm*—Morgan, Lewis & Bockius, LLP (57) ABSTRACT

A laser beam optical system for an LCD device includes a laser light source, a variable attenuator for controlling an intensity of a laser light from the laser light source, a telescope lens for gathering the laser light having the controlled intensity from the variable attenuator in the length and width directions, a beam homogenizer including a filter for controlling a sectional profile of the laser light from the telescope lens vertical to the length direction, a condenser for focusing the laser light from the beam homogenizer, and a target to which the laser light is irradiated.

27 Claims, 5 Drawing Sheets

LASER OPTICAL SYSTEM FOR LIQUID CRYSTAL DISPLAY DEVICE

This application claims the benefit of Korean Patent Application No. 2003-95741, filed on Dec. 23, 2003, which is hereby incorporated by reference.

BACKGROUND OF THE INVENTION

1. Field of the Invention

The present invention relates to a laser optical system, and more particularly, to a laser optical system for a liquid crystal display device (LCD), which includes a filter for changing a laser beam profile.

2. Description of the Background Art

A liquid crystal display (LCD) device has been widely used to display images. Since an image display device requires high speed, the LCD has been developed to have a switching device with high speed operational characteristics. Also, the LCD device uses an array substrate on which a plurality of unit pixels are arranged in a matrix form. A thin film transistor (TFT) is generally used as the switching device for driving the unit pixels. The LCD device uses the TFT having a polysilicon channel layer, which has a high electric mobility. In order to fabricate the polysilicon, a heat treatment method or a laser annealing method may be used. The heat treatment method heats an amorphous silicon in a high temperature furnace until the amorphous silicon is crystallized. The laser anneal method irradiates a high density laser beam to the amorphous silicon to crystallize the amorphous silicon. In the laser annealing method, the crystallization may be done below the glass transition temperature (Tg). Since the laser beam is irradiated to the amorphous silicon in a very short time, the crystallization of the amorphous silicon by the laser anneal method may not cause deformation of glass substrate.

In order to crystallize the amorphous silicon by the laser annealing method, it is necessary to homogeneously irradiate the laser beam to a target material, such as amorphous silicon. Accordingly, a laser optical system for generating a homogeneous laser beam has been designed to include a laser generator, an attenuator controlling density of laser energy from the laser generator, a linear beam processing optical system for changing the laser light having the controlled energy intensity from the attenuator into a linear beam, and a condenser lens for condensing the laser beam from the linear beam processing optical system. The laser beam condensed by the condenser lens is irradiated to the target material, thereby crystallizing an amorphous silicon layer on the target material.

Figure 1:
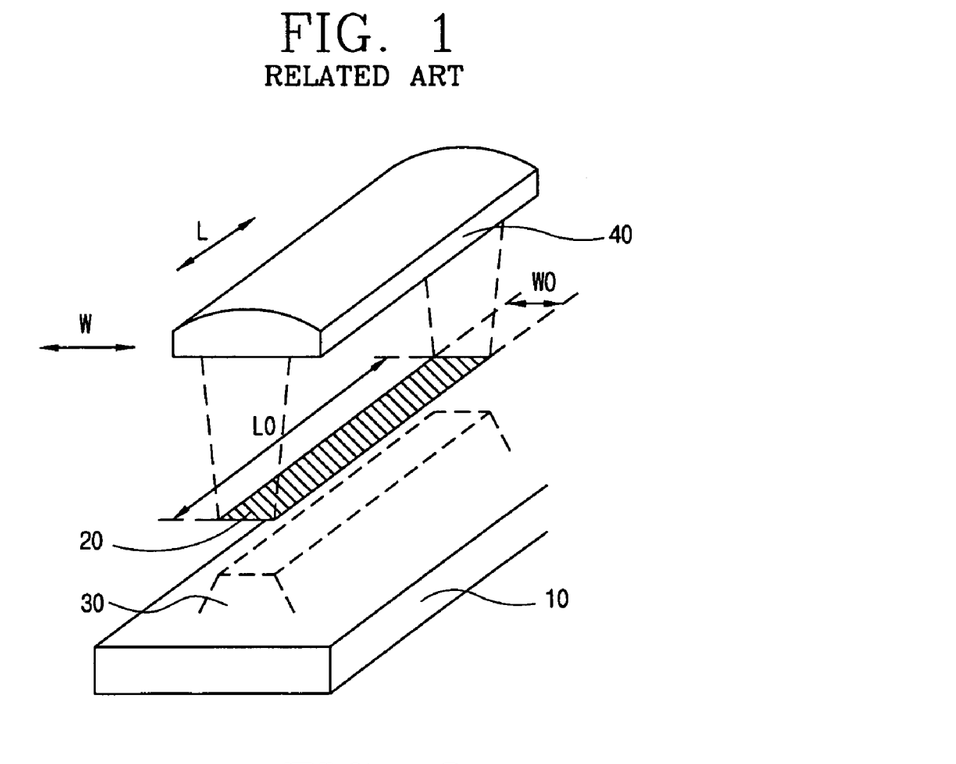
FIG. 1 is an exemplary view illustrating irradiation of a laser light to a substrate.

FIG. 1 is an exemplary diagram illustrating irradiation of a laser light 20 to a substrate (target material) 10. Referring to FIG. 1, the laser light 20 condensed by a condenser lens 40 is a linear laser beam 30 of bar-type having a length of L0 and a width of W0. During crystallization, the laser beam 30 is moved in the direction of width W0 on the substrate 10 by moving the laser optical system or the substrate 10.

Figure 2:
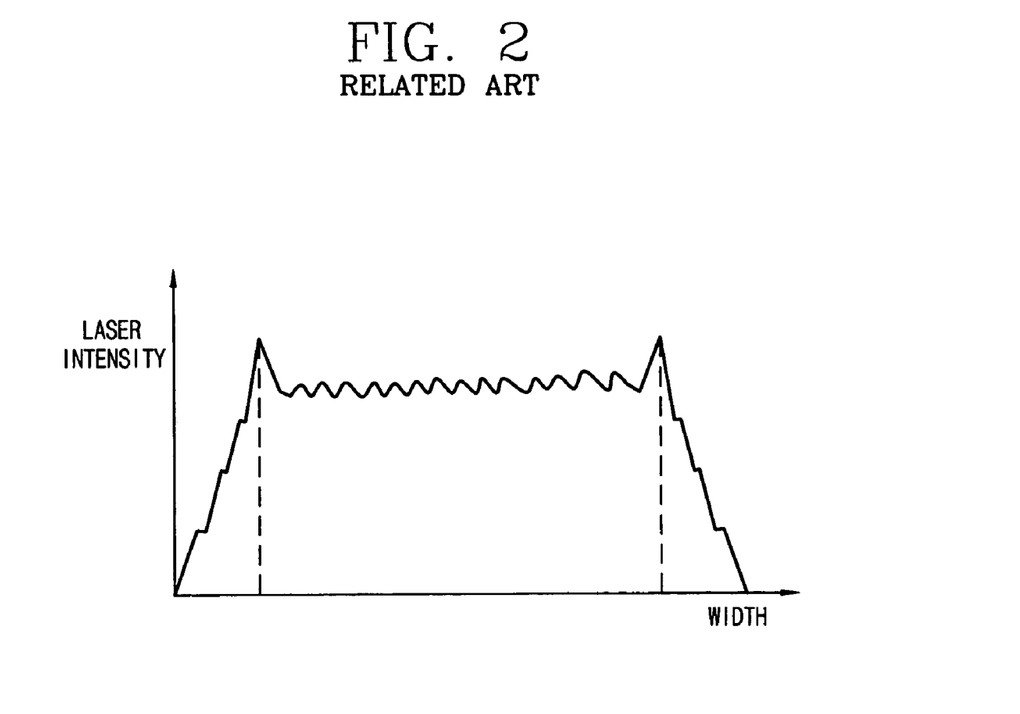
FIG. 2 is a graph illustrating a width profile of a laser beam.

FIG. 2 is a view illustrating a width profile of a laser beam. As shown in FIG. 2, the laser beam's width has a trapezoid shape, but also shows a specific peak in the edges of the width. These peak edges cause defects in the crystallization of the target material, which will now be explained with reference to FIG. 3.

Figure 3:
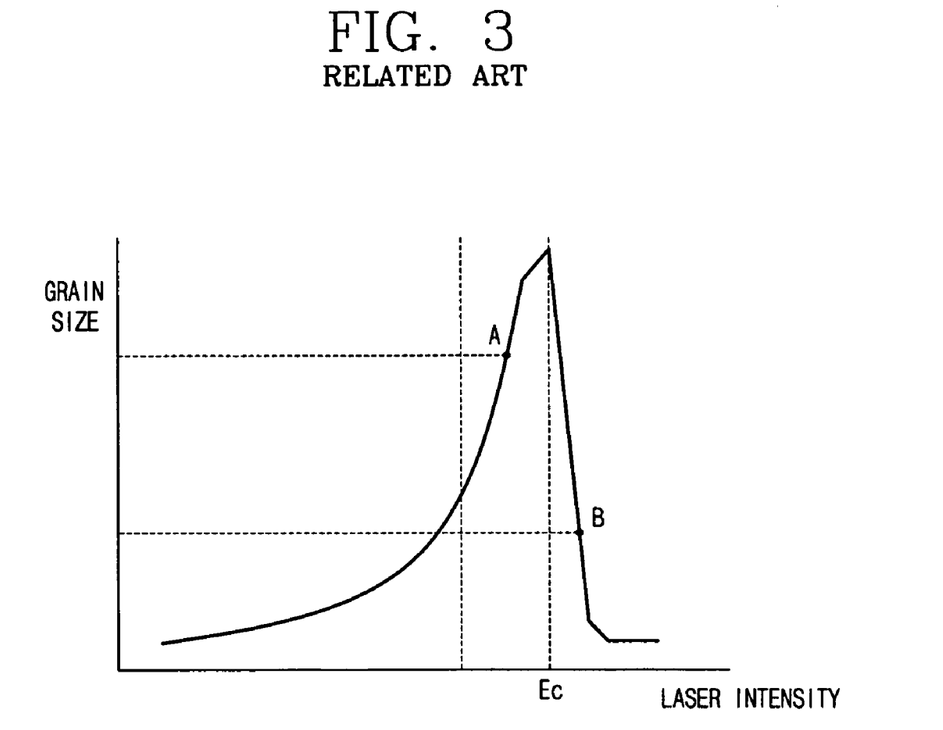
FIG. 3 is a graph showing a relationship between laser intensity and grain size.

FIG. 3 is a graph showing a relationship between laser intensity and crystal grain size. As shown in FIG. 3, the size of grains and the intensity of the irradiated laser energy are proportional to each other until a predetermined energy intensity "Ec," which is regarded as a complete melting point. However, the grain size sharply decreases over the predetermined energy intensity "Ec," and small grains of about 100 (nm) are formed. Specifically, when the laser beam is irradiated to the amorphous silicon layer, the surface of the amorphous silicon is directly exposed by the laser beam, thereby melting the amorphous silicon. However, since the lower portion of the amorphous silicon layer is irradiated by a weak laser beam, some non-melted silicon particles may remain. Therefore, large grains are grown from seeds of the lower portion of the amorphous silicon during the crystallizing.

On the other hand, when the laser beam having an intensity exceeding the complete melting point is irradiated to the amorphous silicon, the amorphous silicon does not have seeds of crystallization. When the completely melted amorphous silicon is cooled without the seeds, the seeds are randomly generated in a melted region, and the amorphous silicon is crystallized from the seeds while the grain size is very small. A point "B" of FIG. 3 shows the small grain size formed in a completely melted region.

Accordingly, when the laser beam is irradiated to the amorphous silicon in the width direction, if the peak is generated in the edges of the laser as shown in FIG. 2, the grains generated by the peak laser are very small. That is, as shown in FIG. 3, when the laser beam having an intensity equal to the complete melting point "Ec" is irradiated in order to maximize the size of the grains, very small grains are generated by the peak laser proceeding the complete melting point "Ec." If the intensity of the peak exceeds the critical point "Ec," the size of the grains generated sharply decreases as shown in "B" of FIG. 3.

However, as described above, if the peak is generated at the edges of the laser beam, the grain size is sharply changed into the very small area where the laser beam is irradiated. While the polysilicon having a large grain size is required to form a polysilicon TFT, it is also very important to form the polysilicon evenly. If the polysilicon is formed with grains having various sizes by using a laser beam having the peak, characteristics of the LCD device are deteriorated.

SUMMARY OF THE INVENTION

Accordingly, the present invention is directed to a laser optical system for an LCD device that substantially obviates one or more of the problems caused by limitations and disadvantages of the related art.

An object of the present invention is to provide a laser optical system including a filter for changing a top end profile of a laser beam in the width direction in order to prevent grain sizes from being changed by a linear laser beam.

Another object of the present invention is to create a laser beam having various profiles by using one filter.

To achieve these and other advantages and in accordance with the purpose of the present invention, as embodied and broadly described herein, there is provided a laser optical system including a laser light source, a variable attenuator for controlling an intensity of a laser light from the laser light source, a telescope lens for focusing the laser light having the controlled intensity from the variable attenuator in the length and width directions, a beam homogenizer, including a filter, for controlling a sectional profile of the laser light from the telescope lens, a condenser for focusing the laser light from the beam homogenizer, and a target to which the laser light is irradiated. Preferably, the filter includes: a frame having a laser transmission region; at least one beam interception string across the laser transmission region; at least two first micrometers for controlling the positions of the beam interception strings; a means for support on which at least one first micrometer is formed; and a second micrometer for controlling the position of the means for support.

In another aspect, a laser optical system including a laser light source, a variable attenuator for controlling an intensity of a laser light from the laser light source, a telescope lens, including a filter, for focusing the laser light having the controlled intensity from the variable attenuator in the length and width directions, a beam homogenizer for controlling a sectional profile of the laser light from the telescope lens, a condenser for focusing the laser light from the beam homogenizer, and a target to which the laser light is irradiated. Preferably, the filter includes: a frame having a laser transmission region; at least one beam interception string across the laser transmission region; at least two first micrometers for controlling the positions of the beam interception strings; a means for support on which at least one first micrometer is formed; and a second micrometer for controlling the position of the means for support.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 4:
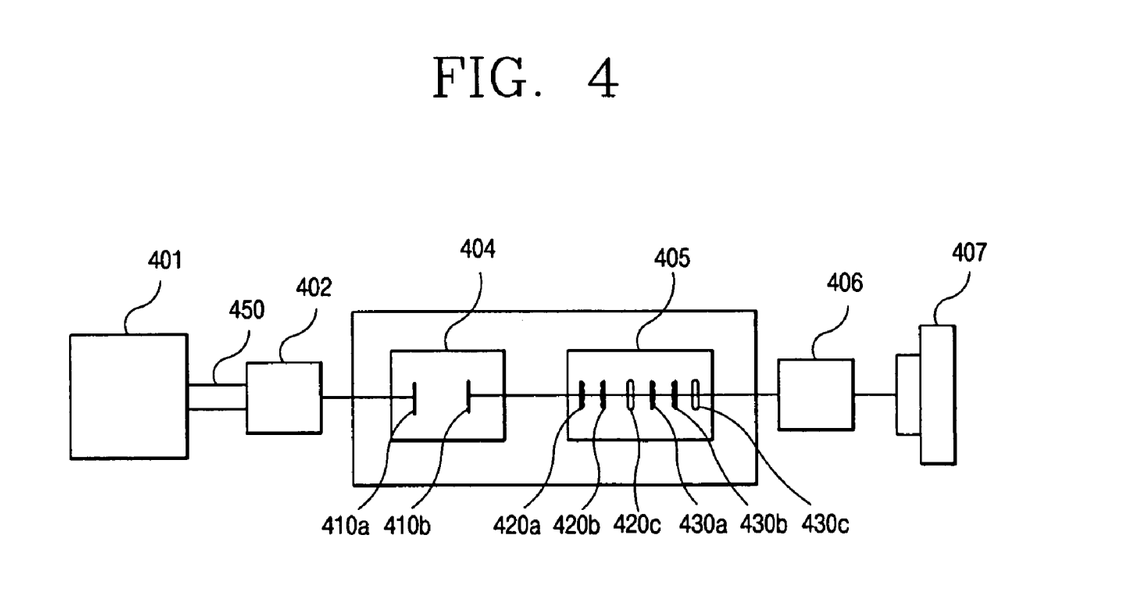
FIG. 4 is an exemplary view schematically illustrating a laser optical system for an LCD according to an embodiment of the present invention.

A laser optical system for an LCD according to an embodiment of the present invention will now be described with reference to FIG. 4. As illustrated in FIG. 4, the laser optical system includes a laser generator 401 for generating a laser light source, a laser light 450 emitted from the laser light source 401, a variable attenuator 402 for controlling intensity of the laser light 450, a telescope lens 404 for telescoping the laser light 450 from the variable attenuator 402 in the width direction, a homogenizer 405 for improving and homogenizing a sectional profile of the laser light 450 telescoped in the width direction by the telescope lens 404, a condenser 406 for focusing the laser light 450 homogenized by the homogenizer 405, and a target 407 to which the laser light 450 is irradiated.

The homogenizer 405 includes a first short axis homogenizer 420a for forming a width direction profile of the laser light 450 from the telescope lens 404, a second short axis homogenizer 420b, a condenser lens 420c, a first long axis homogenizer 430a for homogenizing a length direction laser beam, a second long axis homogenizer 430b and a condenser lens 430c.

The process for condensing the laser light 450 will now be explained. The laser light 450 generated in the laser generator 401 is an optical energy emitted in arbitrary directions. The variable attenuator 402 attenuates the emitted laser light 450 to have a predetermined intensity, and further the telescope lens 404 focuses the laser light 450 in one direction.

The telescope lens 404 includes a first telescope lens 410a and a second telescope lens 410b. The first telescope lens 410a telescopes a short axis direction light of the emitted laser light 450, namely the width of the light, and the second telescope lens 410b telescopes a long axis direction light, namely the length of the light, thereby generating a beam type laser light.

The laser light 450 has a constant intensity of laser energy in the length direction, but shows Gauss distribution in the width direction. That is, the laser light 450 has a peak energy in the center thereof and the lowest energy at the width direction edges. When the laser light 450 is irradiated to the target 407 with different intensity, the grain size is changed. Therefore, the laser light 450 needs to be irradiated with the same intensity. The homogenizer 405 serves to form a homogeneous laser light. That is, the profile of the laser light 450 showing the Gauss distribution is changed by the homogenizer 405. The profile of the laser light 450 needs to be changed on the short axis.

Figure 5:
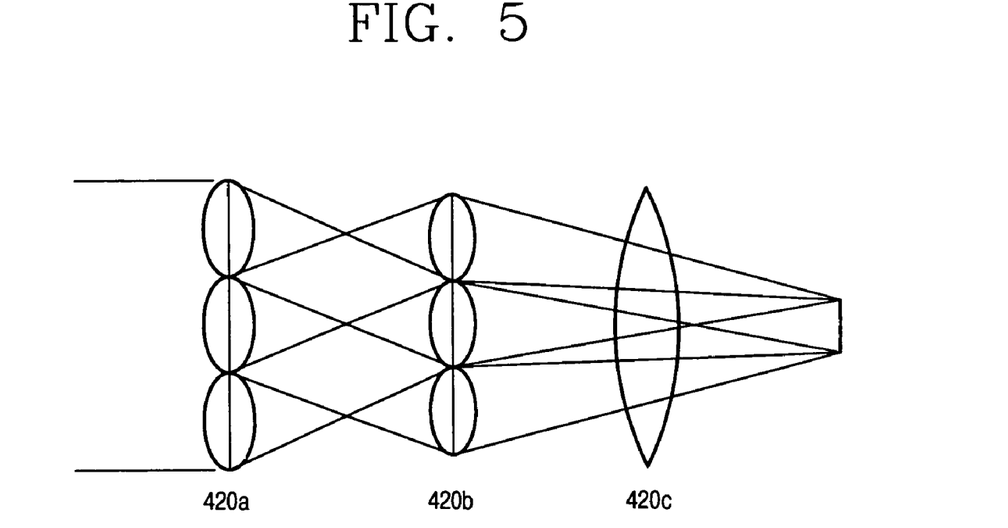
FIG. 5 is a schematic view of condensation of a laser beam in a homogenizer according to an embodiment of the present invention.

The operation of a short axis homogenizer will now be explained with reference to FIG. 5. As shown in FIG. 5, the short axis homogenizer includes the first short axis homogenizer 420a, the second short axis homogenizer 420b and the condenser lens 420c. The first and second short axis homogenizers 420a, 420b includes convex lenses having a predetermined focal distance. In addition, the first and second short axis homogenizers 420a, 420b may include a group of a plurality of convex lenses. Each of the convex lenses is formed by coupling a pair of semi-spherical convex lenses. The convex lenses composing the first short axis homogenizer 420a have the same focal distance.

The sectional profile of the laser light 450 from the telescope lens 404 shows Gauss distribution. The lenses of the first short axis homogenizer 420a primarily condense the laser light 450. The laser light 450 passing through the first short axis homogenizer 420a passes through the second short axis homogenizer 420b, and is condensed by the condenser lens 420c.

Figure 6:
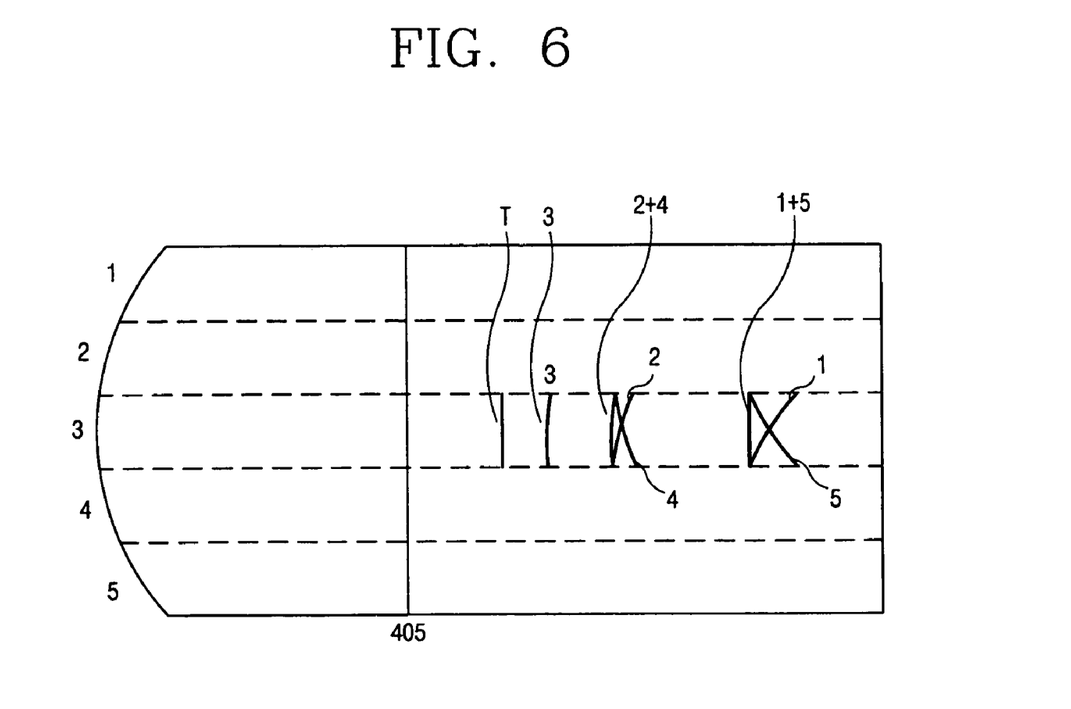
FIG. 6 is an exemplary view illustrating a condensation principle of the laser light according to an embodiment of the present invention.

The process for changing the sectional profile of the laser light 450 by the first short axis homogenizer 420a and the second short axis homogenizer 420b will now be described with reference to FIG. 6. For example, the section of the laser light 450 from the telescope lens 404 is divided into five regions 1–5 as shown in FIG. 6. Parts of the laser light 450 in the regions 1 and 5 have symmetrical profiles, and thus are condensed to complement each other, thereby forming a laser light having a homogeneous profile. In addition, parts of the laser light 450 in the regions 2 and 4 have symmetrical profiles, and thus complement each other, thereby forming a laser light having a homogeneous profile. A part of the laser light 450 in the region 3 passes through the centers of the lenses of the homogenizer 405 as it is. The condensed laser lights are combined to form one homogeneous laser beam T.

When a number of the lenses composing the homogenizer 405 increases, the complementary laser regions are more densely divided, and a laser beam T having the more homogenous profile is obtained. However, even if the laser beam T is homogenized by the homogenizer 405, diffraction of the laser light 450 is generated on each boundary of the lenses of the homogenizer 405, and thus the peak is generated in the edges of the section of the laser light 450.

Figure 7:
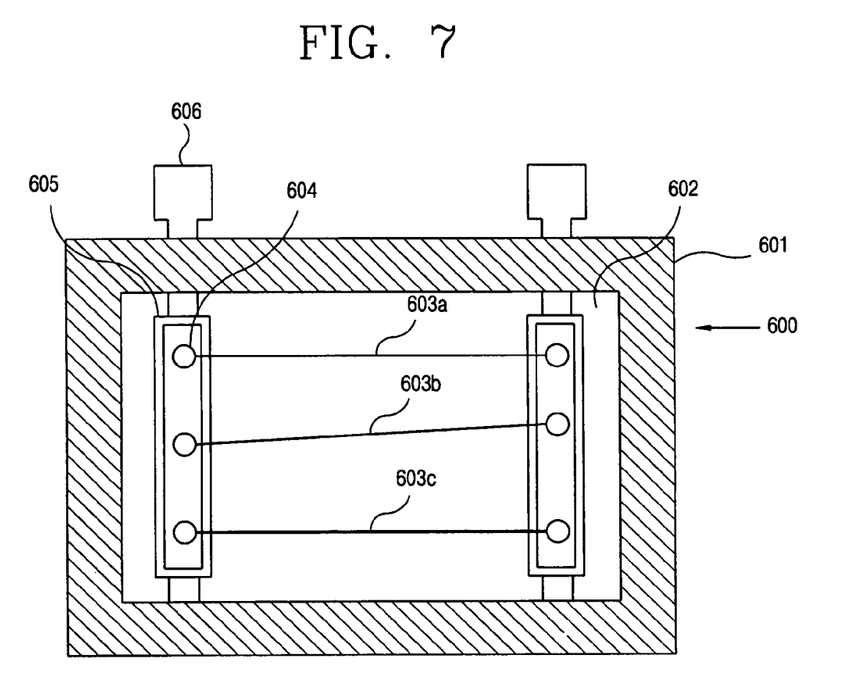
FIG. 7 is a plane view illustrating a filter for changing a laser profile according to an embodiment of the present invention.

In accordance with the present invention, in order to prevent the peak from being generated in the homogenized laser beam T, a filter 600 is formed between the first and second short axis homogenizers 420a, 420b to improve the laser profile. FIG. 7 is a plane view illustrating the filter 600 for changing a laser profile according to an embodiment of the present invention. As shown in FIG. 7, the filter 600 includes a frame 601 having a laser transmission region 602, a plurality of beam interception strings 603a, 603b and 603c acrossing the laser transmission region 602, a plurality of first micrometers 604 for controlling the positions of the beam interception strings 603a, 603b and 603c, a pair of support members 605 on which the plurality of first micrometers 604 are formed, and a pair of second micrometers 606 for controlling the positions of the support members 605.

Also, the filter 600 includes the laser transmission region 602 which the laser beam passes through after passing through the first short axis homogenizer 420a, and a filter frame 601 formed by using a predetermined material for efficiently intercepting the laser beam T.

The pair of support members 605 are formed at both sides of the laser transmission region 602. The pair of second micrometers 606 control the positions of the support members 605. The plurality of first micrometers 604 are formed on the support members 605 so that they can be moved on the support members 605 in the up/down direction.

In addition, the plurality of beam interception strings 603a, 603b and 603c are formed in the laser transmission region 602. Each of the strings 603a, 603b and 603c is connected to the first micrometers 604 to cross the laser transmission region 602 in the horizontal direction. The strings 603a, 603b and 603c may be formed of a predetermined material for intercepting the laser beam. In this embodiment, the strings 603a, 603b and 603c are formed of a kind of metal material such as stainless steel, or the like.

However, the materials for forming the strings 603a, 603b and 603c are not limited to metal materials. Various materials for intercepting the laser beam may be employed.

The strings 603a, 603b and 603c may include various thicknesses of strings, and are movably connected to the first micrometers 604. The thickness of the strings 603a, 603b and 603c may be dependent upon interception of the laser beam. In this embodiment, the strings 603a, 603b and 603c have a thickness of 0.05 to 3 (mm). In addition, the first micrometers 604 can be rotated to control tension of the strings 603a, 603b and 603c.

Figure 8:
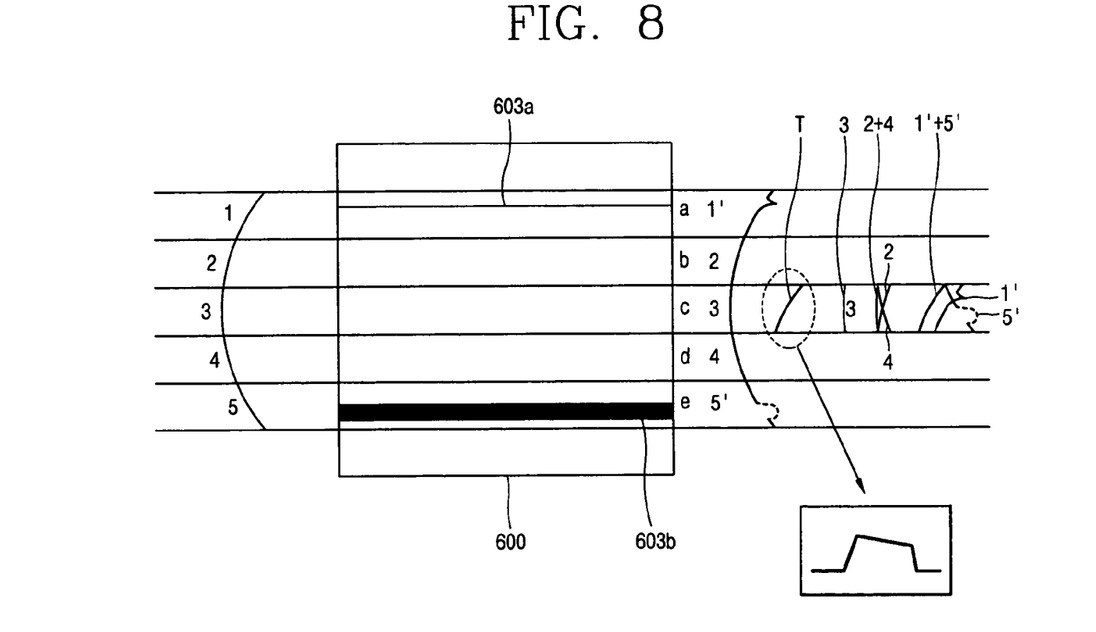
FIG. 8 is an exemplary view illustrating a principle of changing a laser profile by a filter according to an embodiment of the present invention.

The principle of changing the laser profile by the strings 603a, 603b and 603c will now be described with reference to FIG. 8. As shown in FIG. 8, the section of the laser beam passing through the telescope lens 404 shows Gauss distribution where the center has the peak of the energy intensity. When the laser beam passes through the filter 600 including the beam interception strings 603a, 603b and 603c, the laser beam is partially intercepted by the strings 603a, 603b and 603c.

The laser beam is divided into regions 1–5. The laser beam in the region 1 is partially intercepted by the first string 603a, and thus has a partially-distorted profile like the laser profile 1' in "a" region of FIG. 8. The laser beam in the region 5 is partially intercepted by the second string 603b, and thus has a partially-distorted profile like the laser profile 5' in "e" region of FIG. 8. The laser beams in the other regions are not intercepted by the strings of the filter 600, and thus are normally homogenized.

As a result, the laser beams in "a" and "e" regions of FIG. 8 complement each other to form a laser profile distorted in a predetermined pattern, and the laser beams in "b" and "d" regions complement each other to form a laser beam having a homogeneous profile. The laser beam in the region 3 is transferred as it is to form the laser beam in "c" region. In the final laser beam profile obtained by combining the profiles of "a+e," "b+d" and "c" regions, the laser beam has its top end profile sloped as shown in "T" of FIG. 8.

As described above, the top end profile of the laser beam can be variously changed by the filter 600 including the beam interception strings 603a, 603b and 603c. Moreover, the filter 600 may freely change the positions of the strings 603a, 603b and 603c by the first and second micrometers 604, 605. In accordance with present invention, the filter 600 includes various thickness of strings 603a, 603b and 603c, and thus forms the laser beam having various profiles by changing the positions and thickness of the strings 603a, 603b and 603c.

Figure 9:
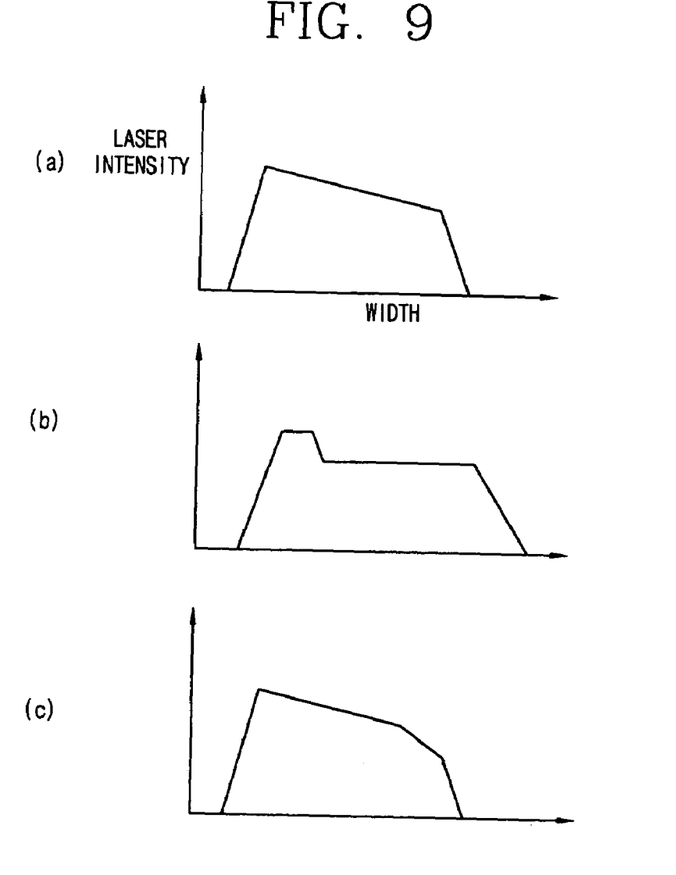
FIG. 9 includes graphs illustrating various laser profiles formed by the filter for changing the laser profile according to an embodiment of the present invention.

FIG. 9 show graphs (a) through (c) illustrating the laser beam having various profiles. The laser beam having the changed top end profile is irradiated to the target by the optical system including the laser beam filter 600. The case of crystallizing the target by using the laser beam having the changed sectional profile will now be described with reference to FIG. 10.

Figure 10:
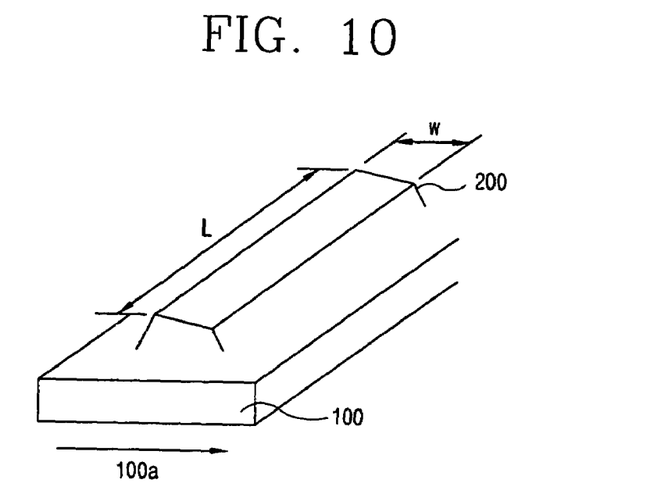
FIG. 10 is an exemplary view schematically illustrating crystallization by a laser beam according to an embodiment of the present invention.

FIG. 10 is an exemplary view schematically illustrating crystallization of the target using the laser beam having "a" profile of FIG. 9. In accordance with the present invention, the laser optical system crystallizes the target by moving a substrate stage 100 in the width direction "w," where the target is mounted. Preferably, the substrate stage 100 is moved from the high laser intensity edge to the low laser intensity edge in the laser beam width direction w. That is, the substrate stage 100 is moved in a direction of 100a as shown in FIG. 10.

The laser optical system uses the homogenizer 405 including the plurality of lenses, and thus the laser beam has a peak in the edges due to diffraction in the edges of each lens. The peak causes heterogeneous crystallization. Therefore, as described above, the laser beam having a low energy intensity is repeatedly irradiated to the overlapping crystallization region, by moving the substrate stage 100 from the high laser intensity edge to the low laser intensity edge 100*a*. As a result, even if the peak is generated in the edges, the peak does not exceed a complete melting point, thereby obtaining homogeneous crystalline.

On the other hand, the filter 600 for changing the laser beam profile may be formed in the telescope lens 404, not in the homogenizer 405. The filter 600 may change the profile in the telescope lens 404 in advance, and input the laser beam to the homogenizer 405. That is, the laser optical system may be formed with the filter 600 between the first and second telescope lenses 410*a*, 410*b*.

As discussed above, in accordance with the embodiment of the present invention, the optical system for an LCD device is provided with the filter for changing the top end profile of the laser beam for the crystallization. The top end profile of the laser beam is controlled to achieve homogeneous crystallization. Furthermore, the filter for changing the laser beam profile includes different thickness of strings and controls the positions of the strings, thereby efficiently forming the laser beam having a desired profile.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A laser optical system for a liquid crystal display device, comprising:
    a laser light source;
    a variable attenuator for controlling an intensity of a laser light from the laser light source;
    a telescope lens for gathering the laser light having the controlled intensity from the variable attenuator in the length and width directions;
    a beam homogenizer, including a filter arranged inside the beam homogenizer, for controlling a sectional profile of the laser light from the telescope lens vertical to the length direction;
    a condenser for focusing the laser light from the beam homogenizer; and
    a target to which the laser light is irradiated.

2. The laser optical system of claim 1, wherein the telescope lens comprises a first telescope lens, and a second telescope lens facing the first telescope lens.

3. The laser optical system of claim 1, wherein the beam homogenizer comprises a short axis optical homogenizer and a long axis optical homogenizer.

4. The laser optical system of claim 3, wherein the short axis optical homogenizer comprises a first short axis optical homogenizer, a second short axis optical homogenizer and a short axis optical condenser lens.

5. The laser optical system of claim 3, wherein the long axis optical homogenizer comprises a first long axis optical homogenizer, a second long axis optical homogenizer and a long axis optical condenser lens.

6. The laser optical system of claim 3, wherein the filter is arranged between the short axis optical homogenizer and the long axis optical homogenizer.

7. The laser optical system of claim 1, wherein the filter comprises:
    a frame having a laser transmission region;
    at least one beam interception string across the laser transmission region;
    at least a pair of first micrometers for controlling the positions of the beam interception strings;
    a support member on which at least one first micrometer is formed; and
    a second micrometer for controlling the position of the support member.

8. The laser optical system of claim 7, wherein the beam interception strings are different in thickness.

9. The laser optical system of claim 8, wherein the thickness of the beam interception strings ranges from 0.05 (mm) to 3 (mm).

10. The laser optical system of claim 7, wherein the first micrometers are movable on the support member.

11. The laser optical system of claim 7, wherein the beam interception strings are formed by a metal material.

12. The laser optical system of claim 11, wherein the beam interception strings are formed by stainless steel.

13. The laser optical system of claim 1, wherein the target is a substrate of the liquid crystal display device.

14. A laser optical system for a liquid crystal display device, comprising:
    a laser light source;
    a variable attenuator for controlling an intensity of a laser light from the laser light source;
    a telescope lens, including a filter arranged inside the telescope lens, for gathering the laser light having the controlled intensity from the variable attenuator in the length and width directions;
    a beam homogenizer for controlling a sectional profile of the laser light from the telescope lens vertical to the length direction;
    a condenser for focusing the laser light from the beam homogenizer; and
    a target to which the laser light is irradiated.

15. The laser optical system of claim 14, wherein the telescope lens comprises a first telescope lens, and a second telescope lens facing the first telescope lens.

16. The laser optical system of claim 15, wherein the filter is arranged between the first telescope lens and the second telescope lens.

17. The laser optical system of claim 14, wherein the beam homogenizer comprises a short axis optical homogenizer and a long axis optical homogenizer.

18. The laser optical system of claim 17, wherein the short axis optical homogenizer comprises a first short axis optical homogenizer, a second short axis optical homogenizer and a short axis optical condenser lens.

19. The laser optical system of claim 17, wherein the long axis optical homogenizer comprises a first long axis optical homogenizer, a second long axis optical homogenizer and a long axis optical condenser lens.

20. The laser optical system of claim 14, wherein the filter comprises:
    a frame having a laser transmission region;
    at least one beam interception string across the laser transmission region;
    at least a pair of first micrometers for controlling the positions of the beam interception strings;

a support member on which at least one first micrometer is formed; and a second micrometer for controlling the position of the support member.

21. The laser optical system of claim 20, wherein the beam interception strings are different in thickness.

22. The laser optical system of claim 21, wherein the thickness of the beam interception strings ranges from 0.05 (mm) to 3 (mm).

23. The laser optical system of claim 20, wherein the first micrometers are movable on the support member.

24. The laser optical system of claim 20, wherein the beam interception strings are formed by a metal material.

25. The laser optical system of claim 24, wherein the beam interception strings are formed by stainless steel.

26. The laser optical system of claim 20, wherein the filter is formed between the pair of first telescope lenses and the second telescope lens.

27. The laser optical system of claim 14, wherein the target is a substrate of the liquid crystal display device.

* * * * *